Figure 1:
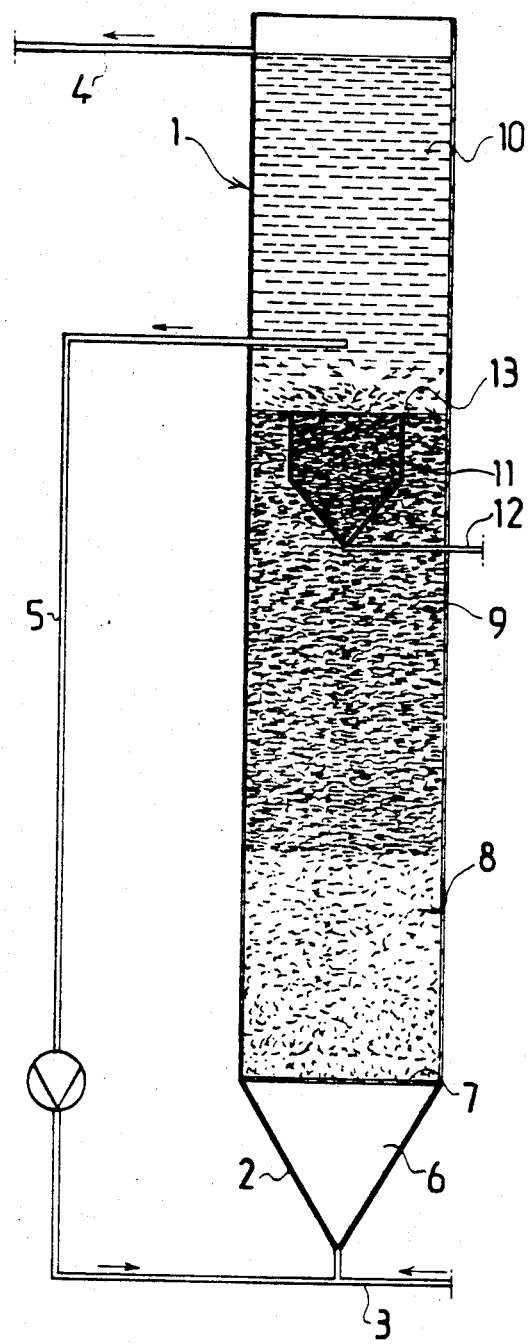

United States Patent [19]

Titoff

[11] Patent Number: 4,612,115
[45] Date of Patent: Sep. 16, 1986

[54] FLOATING BED REACTOR

[75] Inventor: Juha Titoff, Kerimäki, Finland

[73] Assignee: Enso-Gutzeit Oy, Finland

[21] Appl. No.: 672,290

[22] Filed: Nov. 16, 1984

[30] Foreign Application Priority Data

Nov. 18, 1983 [FI] Finland ................................ 834233

[51] Int. Cl.$^4$ .......................... B01D 41/02; C02F 3/06
[52] U.S. Cl. .................................... 210/189; 210/269;
210/618; 210/786
[58] Field of Search ............... 210/618, 786, 795, 189,
210/150, 268, 269, 279, 675, 676

[56] References Cited

U.S. PATENT DOCUMENTS

| | | | |
|---|---|---|---|
| 3,082,165 | 3/1963 | Kroeper et al. | 210/189 X |
| 3,802,567 | 4/1974 | Kunz | 210/189 |
| 4,052,300 | 10/1977 | Mosso | 210/786 |
| 4,105,549 | 8/1978 | Kakumoto et al. | 210/189 X |
| 4,197,201 | 4/1980 | Hjelmner et al. | 210/189 |
| 4,478,726 | 10/1984 | Moore | 210/795 X |
| 4,479,880 | 10/1984 | Treanor | 210/795 |

Primary Examiner—Thomas Wyse
Attorney, Agent, or Firm—Toren, McGeady, Stanger, Goldberg & Kiel

[57] ABSTRACT

The present invention concerns a floating bed reactor which is used for biological purification of fibre-containing liquid suspensions and for simultaneous clarification. The reactor comprises a floating bed (8) composed of finely divided particles floating in an ascending flow, above it being formed a fibre agglomerate layer (9) which binds to itself fibres present in the suspension being treated. What is essential in the invention is that the removal of fibre agglomerate from the reactor has been arranged with the aid of an open-top collecting vessel (11) placed in the reactor and disposed to collect fibre agglomerate in itself so that the top margin of the agglomerate layer (9) positions itself in the reactor substantially on level with the top end of the collecting vessel. The agglomerate then moves into the collecting vessel (11) by effect of a trailing vortex, for the generation of which the top end (13) of the vessel is bordered by a flow guiding member projecting laterally therefrom, or encircling it. The reactor of the invention is particularly suitable for treating cellulose fibre-containing effluents of the wood processing industry.

6 Claims, 8 Drawing Figures

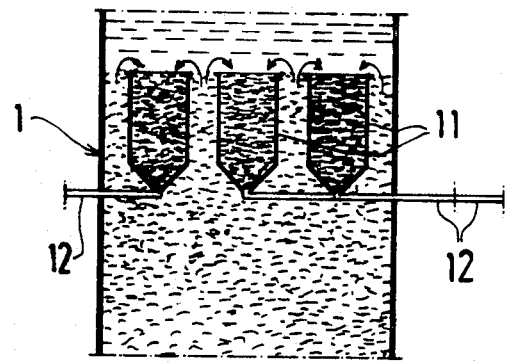
Fig. 2
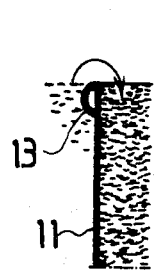 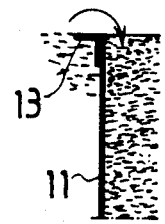 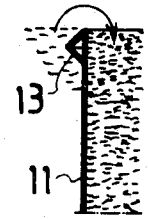 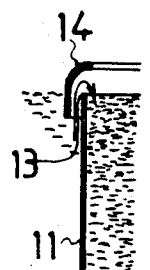
Fig. 3  Fig. 4  Fig. 5  Fig. 6
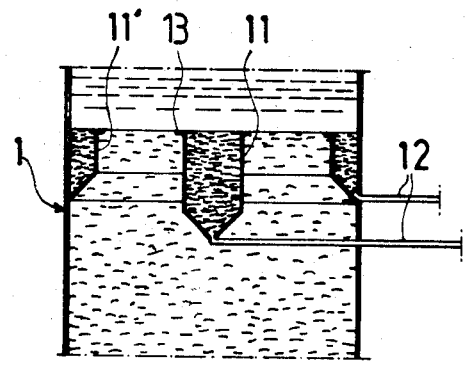 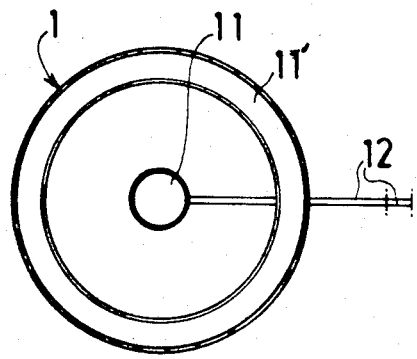
Fig. 7  Fig. 8

FLOATING BED REACTOR

The present invention concerns a floating bed reactor intended to be used for biological purification of liquid suspensions containing fibrous solid matter, and for their simultaneous clarifying, said reactor comprising members for conducting the liquid to be treated through the reactor as a flow ascending upwards from below, a particle mass floating in the ascending flow, and members for removing the fibre agglomerate accumulating above the floating bed.

Liquid suspensions containing fibrous solid matter, which are particularly produced in processes of the cellulose and paper industry, have been clarified mainly with clarifiers acting on the settling principle. In the international patent application PCT/FI No. 82/00065, a procedure has however been disclosed for clarifying such suspensions and in which a floating bed reactor is used. According to the procedure, above the finely divided particles floating in the reactor is formed a fibre agglomerate layer which binds to itself fibrous matter from the flow passing through the bed. When effluents of the wood-processing industry are treated in a floating bed reactor of this type, biological purification is achieved with the reactor on the side of clarification, based on the activity of a microorganism that has become attached to the surface of the floating particles.

Since the fibre agglomerate layer in the floating bed reactor may continuously increase in the course of the biological purification and clarification process, it is necessary to attend to removing the agglomerate, in order to prevent blocking of the reactor. In the design disclosed in the international patent application PCT/FI 82/00065, the floating bed reactor has been provided with one or more agglomerate discharge lines, which may start from the side of the reactor or from the middle of the reactor space. A drawback of this design is, however, that much water escapes from the reactor together with the agglomerate of very low solid matter content. In addition, the surface of the agglomerate layer rises very close to the top end of the reactor, whereby some of the agglomerate may enter the circulation pipe by which liquid is circulated from the upper part of the reactor down to its lower end in order to obtain appropriate floatation of the finely divided particles.

Such entrainment of agglomerate with the circulation is harmful because the agglomerate disturbs the floatation and may in addition cause blocking in the flow guiding members located in the lower part of the reactor.

The object of the present invention is to provide a design for removing the fibre agglomerate from the floating bed reactor so that the drawbacks mentioned are avoided. The invention is characterized in that the reactor comprises an open-top collecting vessel past which the ascending flow passes and which has been arranged to collect in itself fibre agglomerate accumulating above the floating bed, whereby the collecting vessel, when it operates, maintains the upper margin of the agglomerate layer substantially on level with the top end of the collecting vessel, and said top end of the collecting vessel being bordered by a flow guiding member projecting therefrom laterally, or encircling it, producing a trailing vortex in the ascending flow, which boosts the guiding of fibre agglomerate over the rim of the collecting vessel and into the vessel.

In the floating bed reactor of the invention the advantage is gained that the top margin of the agglomerate layer can be maintained on a certain level which lies below the end of the circulation pipe. This prevents agglomerate from entering the circulation and eliminates the harmful effects consequent thereupon. In addition, with the aid of the collecting vessel the agglomerate can be compacted so that its solid matter content increases, whereby the quantity of water departing from the reactor together with the agglomerate will be less than before.

As taught by the invention, the top margin of the fibre agglomerate collecting vessel may be provided with a laterally protruding or other equivalent projection which boosts the guiding of agglomerate over the rim into the vessel. Alternatively, the collection of agglomerate can be boosted by means of a separate guiding member encircling the upper rim of the collecting vessel with a given spacing. In either case, the guiding of the agglomerate into the collecting vessel is based on a trailing vortex produced in the ascending flow, which pushes agglomerate up over the collecting vessel, where the surface load is zero, whereby the agglomerate is enabled by gravity effect to sink into the vessel.

The fibre agglomerate collecting vessel of the invention is preferably shaped to be tapering at the lower end, and placed in the reactor relatively high up in such manner that its location in the flow cross-section of the reactor is symmetric with reference to the centre of this cross-section. Such shaping and placement of the collecting vessel conforms best to the flow rising from down upwards in the reactor and allows adequate space for the agglomerate layer to form therein.

Furthermore, it is possible that the floating bed reactor of the invention comprises several fibre agglomerate collecting vessels, their location symmetric in the flow cross-section of the reactor with reference to the centre of this cross-section. For instance, in a reactor with circular cross-section one collecting vessel may be placed in the centre of the reactor, in the horizontal plane, 2nd the rest of the collecting vessels thereabound in annular arrangement. Instead of the last-mentioned, or in addition to them, for collecting vessel may also be used a gutter attached to the inside of the reactor wall and running annularly around the reactor.

The invention is described in the following more in detail with the aid of examples, referring to the drawings attached, in which FIG. 1 presents a floating bed reactor according to the invention with which fibre-containing effluents of the wood-processing industry are purified and clarified and which is provided with a fibre agglomerate collecting vessel, FIG. 2 presents part of another floating bed reactor according to the invention, provided with several parallel fiber agglomerate collecting vessels, FIGS. 3-5 show three different designs for shaping the top margin of the collecting vessel in such manner that a trailing vortex guiding the agglomerate is produced, FIG. 6 shows a top margin of the collecting vessel encircled with a separate guiding member guiding the fiber agglomerate, FIG. 7 presents part of one more floating bed reactor according to the invention, provided with a collecting vessel located in the centre of the reactor and with an annular collecting vessel attached to the inner reactor wall surface, and FIG. 8 shows the reactor of FIG. 7 in top view.

In FIG. 1, a floating bed reactor according to the invention is depicted, in which is purified and clarified fibre-containing effluent of the cellulose industry with the aid of finely divided particles floating in the ascending effluent flow. The floating particles may be carbon, sand, resin or other equivalent material, and they serve as substrate for a microorganism effecting the biological purification of the effluent. Above the floating bed is formed an agglomerated fibre bed which clarifies the water by retaining in itself a predominant part of the cellulose fibres present in the water.

The floating bed reactor just presented is composed of a vertical tank 1 with circular cross-section and its lower part 2 having been shaped to be conical. The effluent to be treated enters the lower end of the reactor by the inlet pipe 3, and the treated, purified and clarified water is removed from the top end of the reactor into the exit pipe 4. In addition, the reactor comprises a circulation pipe 5, by which water to be treated is circulated from the upper part of the reactor to the lower end thereof in order to maintain the desired flow rate in the floating bed.

The effluent supplied into the reactor through the inlet and circulation pipes 3 and 5 first enters the conically widening space 6 in the lower part 2 of the reactor, which contains a horizontal perforated plate 7 serving as a guiding member. The purpose with the perforated plate 7 is to distribute the flow as uniformly as possible over the cross-section area of the reactor and to stabilize the flow by reducing the vortices occurring therein.

The floating bed 8 constituted by finely divided floating particles, in which biological purification of the effluent takes place, is located in the reactor above the conically widening space. On top of the floating bed 8 has been formed an agglomerated fibre bed 9, which clarifies the water by retaining in itself cellulose fibres present in the water. The purified and clarified water accumulates in a layer 10 over the agglomerate layer 9 and departs from the reactor through the exit pipe 4.

Since fibre material continuously enters the reactor with the water that is being treated, and is retained in the fiber agglomerate layer 9, it is necessary to attend to removal of the fibre material in order to prevent excessive growth of the agglomerate layer in the reactor. To this end there has been placed in the upper part of the reactor, slightly below the end of the circulation pipe 5, an agglomerate collecting vessel 11 which is provided with a drain pipe 12 starting on the bottom of this vessel. The collecting vessel 11 has been designed to be conical of its lower part and placed, in horizontal direction, in the centre of the reactor, whereby the disturbance of the ascending flow in the reactor by this vessel is minimized. The collecting vessel is open at the top, whereby the top margin of the fibre agglomerate layer 9 positions itself in the reactor on level with the top margin 13 of the collecting vessel and the agglomerate moves over the rim into the vessel by effect of the trailing vortices occuring in the ascending flow. This is because the vortices move the agglomerate to an elevation over the open collecting vessel 11, where the surface load is zero, whereby the agglomerate is free to sink into the vessel. In the collecting vessel 11 the agglomerate is compacted so that its solid matter content may vary in the range 0.1–1.0%, while at the same time the solid matter content of the agglomerate in the bed 9 outside the vessel is 0.2–0.3%.

The generation of trailing vortices transferring the agglomerate into the collecting vessel 11 can be boosted with the aid of appropriate shaping of the top margin 13 of the vessel. In FIGS. 3–5, three different profiles of the rim 13 of the collecting vessel are presented, in each of them the rim protruding laterally from the wall of the vessel. In FIG. 3 the rim is composed of U section, in FIG. 4 of L section, and in FIG. 5 of V section.

In FIG. 6 is presented an alternative design, in which the top margin 13 of the collecting vessel 11 has been encircled with a guiding member 14 separated therefrom. The agglomerate may then go into the collecting vessel 11 either through the gap between the vessel's rim 13 and the guiding member 14, or over the guiding member 14.

When the reactor is operated, the collecting vessel need not absolutely be continuously emptied: one may allow the vessel to fill up in the intervals so that the top margin of the fibre agglomerate layer 9 is enabled to rise somewhat higher than the top end 13 of the vessel. This is because the top margin of the agglomerate layer 9 can be made to return into register with the top end 13 of the vessel 11 simultaneously as emptying of the vessel is started. Care should however be taken when regulating the level of the top margin of the agglomerate layer 9 that the agglomerate layer will at no stage rise to such height that agglomerate would be entrained in the circulation.

The collecting of fibre agglomerate and its removal from the reactor may take place not only with the aid of one collecting vessel 11 but also with a plurality of parallel collecting vessels 11. In FIG. 2 is presented a construction in which altogether five collecting vessels 11 are placed side by side in such manner that one vessel is located in the centre of the reactor 1, and the other four vessels (two of them visible in the figure) are placed symmetrically on different sides of the first-mentioned vessel. On the other hand, in FIGS. 7 and 8 is presented a construction comprising two collecting vessels, one of the vessels 11 being placed in the centre of the reactor 1 and the other vessel 11' consisting of a groove attached to the inner surface of the reactor wall and running annularly around the reactor. Functionally, these designs are fully equivalent with that presented above.

It is obvious to a person skilled in the art that various embodiments of the invention are not confined to the examples presented and may vary within the scope of the claims stated below. For instance, the collecting vessel may have any desired shape which conforms with appropriate streamlining to the flow passing by the vessel. Moreover, when several collecting vessels are used, not all of them must necessarily be located at the same elevation in the reactor. For instance, in the design of FIGS. 7 and 8 the upper rim of the groove-resembling collecting vessel running around the reactor may be located slightly higher than the collecting vessel in the centre of the reactor.

I claim:

1. A floating bed reactor, intended for biological purification of liquid suspensions containing fibrous solid matter and for its simultaneous clarification, comprising a vertical reactor tank having a liquid inlet at the lower end thereof and a liquid outlet for discharging pure and clarified liquid from said reactor tank at the upper end thereof, means in said tank for guiding the liquid to be treated as a flow ascending upwardly from the inlet through the reactor tank, a particle mass for effecting bioligical purification is located only within the lower part of said tank above said liquid inlet and floating in the ascending flow with said particle mass extending for a portion of the vertical height of said reactor tank and with the upper end of said particle mass being spaced downwardly from the upper end of said reactor tank so that a flow of the liquid suspension passes upwardly after traversing the particle mass, and at least one upwardly extending collecting vessel with an open top is positioned within said tank and is spaced above said floating particle mass and below said liquid outlet, said collecting vessel having a drain pipe connected to the lower end thereof with said drain pipe extending outwardly from said collecting vessel through said reactor tank whereby the ascending liquid flow passes said collecting vesssel and said collecting vessel is arranged to collect fibre agglomerate accumulating above the floating bed entering through said open top thereof, said collecting vessel is spaced inwardly from said reactor tank forming an annular passage for the unimpeded upward flow of the liquid, the collecting vessel, as it operates, being arranged to keep the top margin of the agglomerate layer in the reactor tank substantially on the level with the open top of the collecting vessel, and the open top of said collecting vessel being bordered by a flow guiding member protruding laterally outwardly therefrom and producing a trailing vortex in the ascending flow, which boosts the guiding of fibre agglomerate over the collecting vessel's open top into the vessel.

2. Floating bed reactor according to claim 1, wherein the guiding member comprises one of a flange protruding laterally outwardly from the open top of the at least one collecting vessel and another equivalent projection.

3. Floating bed reactor according to claim 1, wherein the open top of the at least one collecting vessel is encircled by a guiding member separate therefrom and on both sides of which guiding of fibre agglomerate into the collecting vessel takes place.

4. Floating bed reactor according to claim 1, comprising said at least one collecting vessel located symmetrically in the flow cross-section of the reactor.

5. Floating bed reactor according to claim 1, wherein said vertical reactor tank has a central vertical axis, said at least one collecting vessel symmetrically arranged on said vertical axis and a plurality of other collecting vessels located within said tank and spaced outwardly from said collecting vessel located on said vertical axis and spaced symmetrically around the vertical axis.

6. Floating bed reactor according to claim 1, wherein said reactor tank has a central vertical axis, said at least one collecting vessel positioned symmetrically on said vertical axis and an annular shaped collecting vessel encircling said collecting vessel on the vertical axis and secured to and extending around the inside surface of said reactor tank.

* * * * *